United States Patent [19]
Garrec

[11] Patent Number: 5,937,699
[45] Date of Patent: Aug. 17, 1999

[54] TELESCOPIC SYSTEM HAVING A ROTATION TRANSMISSION LINK BETWEEN A SCREW AND NUT OF A MODULE

[75] Inventor: Philippe Garrec, Paris, France

[73] Assignee: Commissariat a l'Energie Atomique, Paris, France

[21] Appl. No.: 08/640,768

[22] PCT Filed: Sep. 6, 1995

[86] PCT No.: PCT/FR95/01150

§ 371 Date: May 13, 1997

§ 102(e) Date: May 13, 1997

[87] PCT Pub. No.: WO96/07513

PCT Pub. Date: Mar. 14, 1996

[30] Foreign Application Priority Data

Sep. 7, 1994 [FR] France .................................. 94 10708

[51] Int. Cl.[6] .................................................. F16H 27/02
[52] U.S. Cl. .................................. 74/89.15; 74/424.8 R; 74/459
[58] Field of Search ................................ 74/89.15, 127, 74/424.8 R, 509, 459

[56] References Cited

U.S. PATENT DOCUMENTS

| | | | |
|---|---|---|---|
| 4,938,090 | 7/1990 | Brusasco | 74/424.8 R |
| 5,033,566 | 7/1991 | Moretti et al. | 74/89.15 |
| 5,094,118 | 3/1992 | Morita | 74/424.8 R |
| 5,111,708 | 5/1992 | Brusasco | 74/89.15 |
| 5,111,709 | 5/1992 | Torii et al. | |
| 5,214,972 | 6/1993 | Larson et al. | 74/89.15 |
| 5,228,353 | 7/1993 | Katahira et al. | 74/89.15 |
| 5,472,065 | 12/1995 | Vergin | 74/89.15 |

FOREIGN PATENT DOCUMENTS 0 082 386   6/1983   European Pat. Off. .

*Primary Examiner*—John A. Jeffery
*Assistant Examiner*—David Fenstermacher
*Attorney, Agent, or Firm*—Burns, Doane, Swecker & Mathis LLP

[57] ABSTRACT

A telescopic system including a plurality of modules. Each of the modules includes a case, a nut, and a screw. The nut is freely rotatable in the case and is prevented from translating with respect to the case. The screw is engaged with the nut, and each of the cases is mutually freely slidable and prevented from rotating with respect to each other. The modules are arranged in a chain, and adjacent modules in the chain are interconnected by a rotation transmission coupling. The rotation transmission coupling is between one of the screw and the nut of the adjacent modules. Each of the modules includes a rotation transmission link between the screw and the nut.

26 Claims, 5 Drawing Sheets

TELESCOPIC SYSTEM HAVING A ROTATION TRANSMISSION LINK BETWEEN A SCREW AND NUT OF A MODULE

BACKGROUND OF THE INVENTION

1. Field of the Invention

The invention relates to a telescopic system.

2. Description of the Related Art

Telescopic systems include mechanisms constituted by several modules which, at random, can be unfolded/extended or folded in one another, or optionally alongside one another in order to regulate their total length.

Telescopic systems are encountered in numerous technical fields such as cranes, ladders or appendages of robots in order to reach an object having a variable distance or for other functions, specific to each apparatus in which they are incorporated. In the case of robots walking on a series of legs distributed into two sets and which alternatively touch the ground in order to support the robot and are then raised and advanced, telescopic mechanisms equipping the legs in order to shorten and lengthen them make it possible to achieve this procedure in a simple manner, because it is merely necessary to slide the legs along the robot in order to advance the same once they have been raised from the ground. The legs can remain straight and it is pointless to subdivide them into sections articulated to one another and to the robot in order to attempt to reproduce human walking procedure, which requires a more complex structure and causes balance problems.

A first distinction will be made by only attaching interest to mechanisms for which the extension path is greater than the length of the mechanism in the folded state, which imposes the use of at least two modules having an extensible elongation element (such as a sliding tube) and a mechanism joining said elongation element to a preceding elongation element or to a fixed element serving as a base for the mechanism in order to vary the distance separating them and thus controlling the extension of the elongation element. The system is then complicated by the need of adding mechanical links for joining the mechanisms in order to control simultaneously or successively the extension of all the elongation elements.

A current telescopic system used for certain hydraulic cranes consists of several concentric tubes interconnected by jacks arranged in series and communicating with one another by fluid pipes, so that a single pressure source can successively extend them. The control is then ensured by a single action. A multiple action, single jack, i.e. formed by several fitted together, sliding cylinders can also be used with the same advantage. However, jacks are relatively heavy and cumbersome means, which also require flexible supply cables and sensors complicating their installation. Thus, this solution cannot be used in applications such as robotics, where the aim is to reduce to the greatest possible extent the overall weight of the system and the overall dimensions of the control and monitoring means.

A completely different system consists of providing the extension elements with pulleys and cables interconnecting them forming zig-zags. It is sufficient to pull on one cable end in order to simultaneously raise the elements. This system, used for certain ladders and elevators, is characterized by a lack of rigidity, which can be vital for firefighters or furniture removers who have to dock the ladder with a building, but which is unacceptable in other applications, having the disadvantages of limited loading capacity and a problematical behavior of the cables and pulleys over time.

A more complicated system although relatively simple to construct, which has a relatively low weight and a good rigidity, is described with the aid of FIG. 1. It has been used in a robot and consists of three extension modules 1a, 1b and 1c, whereof each comprises a screw 2, a nut 3 engaged with the screw 2, an entry pulley 4 fixed to the rear end of the screw 2, an exit pulley 5 fixed around the nut 3 and coaxial thereto, a screw bearing surface 6 towards the rear of the screw 2 but in front of the pulley 4, a nut bearing surface 7, a rear stop 8 located on the screw 2 just in front of the screw bearing surface 6 and a front stop 9 located well in front of the screw 2. The essential elements of these stops 8 and 9 are springs coaxial to the screw 2.

The entry pulley 4 of the intermediate module 1b is connected by a belt 10 to the exit pulley 5 of the first module 1a and the exit pulley 5 of the module 1b is connected by another belt 11 to the front pulley 4 of the third module 1c. Finally, a third belt 12 connects the pulley 4 of the first module 1a to a driving pulley 13 of a motor 14 fixed to a frame 15.

Each of the modules 1 has a tube 16 provided with a bearing 17 for the nut bearing surface 7 of said module and a bearing 18 for the screw bearing surface 6 of the following module, obviously with the exception of the tube 16 of the third module 1c, which is the last in the system and consequently has no bearing 18. The tubes 16 are concentric, slide in one another and in an external tube 19 rising from the frame 15 to which it is joined And carrying a bearing 20 for the screw bearing surface 6 of the first module 1a. Elementary mechanical devices, which are not shown, such as slides, channels or fittings with polygonal sections, joint the tubes 16 and 19 to one another and prevent them from turning freely, whilst still enabling them to slide.

The starting up of the motor 14 rotates the screw 2 of the first module 1a and nut 3 remains stationary in rotation and moves in translation, driving the tube 16 of the first module 1a and the other modules 1b and 1c until they reach one of the stops 8 and 9 as a function of the rotation direction of the motor 14. The nut 3 is then locked and is rendered integral with the screw 2 and transmits its rotation to the screw 2 of the last module 1b by the belt 10, which displaces the nut 3 and tube 16 of said module 1b and so on until the mechanism of all the modules 11 are locked. However, experience has shown that the system is imperfect with respect to the kinematics, because higher than expected friction occurs between a screw and a nut, the nut being integral with the screw from the outset and the movement firstly relates to the following modules before possibly a complete locking of the latter imposes a resumption of translation of said nut overcoming the friction. Another, possible more serious disadvantage is the presence of stops 8 and 9, which must be equipped with springs to prevent shocks of the nuts 3. The total extension is known, but the stops cause dynamic variations of friction and inertia, which can cause problems in a controlled system. A more regular and foreseeable behaviour of the system is desired.

SUMMARY OF THE INVENTION

The object of the invention is to improve the latter system ensuring a regular extension of the modules and optionally, in an embodiment, a virtually perfect concentricity of the mechanisms in order to obtain a better static equilibrium of the system and small overall dimensions.

The invention therefore relates to a telescopic system formed from several modules each comprising a case, a nut rotating freely in the case and retained in translation in said case, and a screw engaged in the nut, the cases being mutually freely sliding and retained in rotation, the modules being arranged in chain, characterized in that adjacent modules in the chain are interconnected by a rotation transmission coupling between one of the rotary parts, screw and nut, of each of them and that each of the modules comprises a rotation transmission link between its screw and its nut.

BRIEF DESCRIPTION OF THE DRAWINGS

The invention is described in greater detail hereinafter relative to nonlimitative embodiments and the attached drawings, wherein show.

DESCRIPTION OF THE PREFERRED EMBODIMENT

Figure 1:
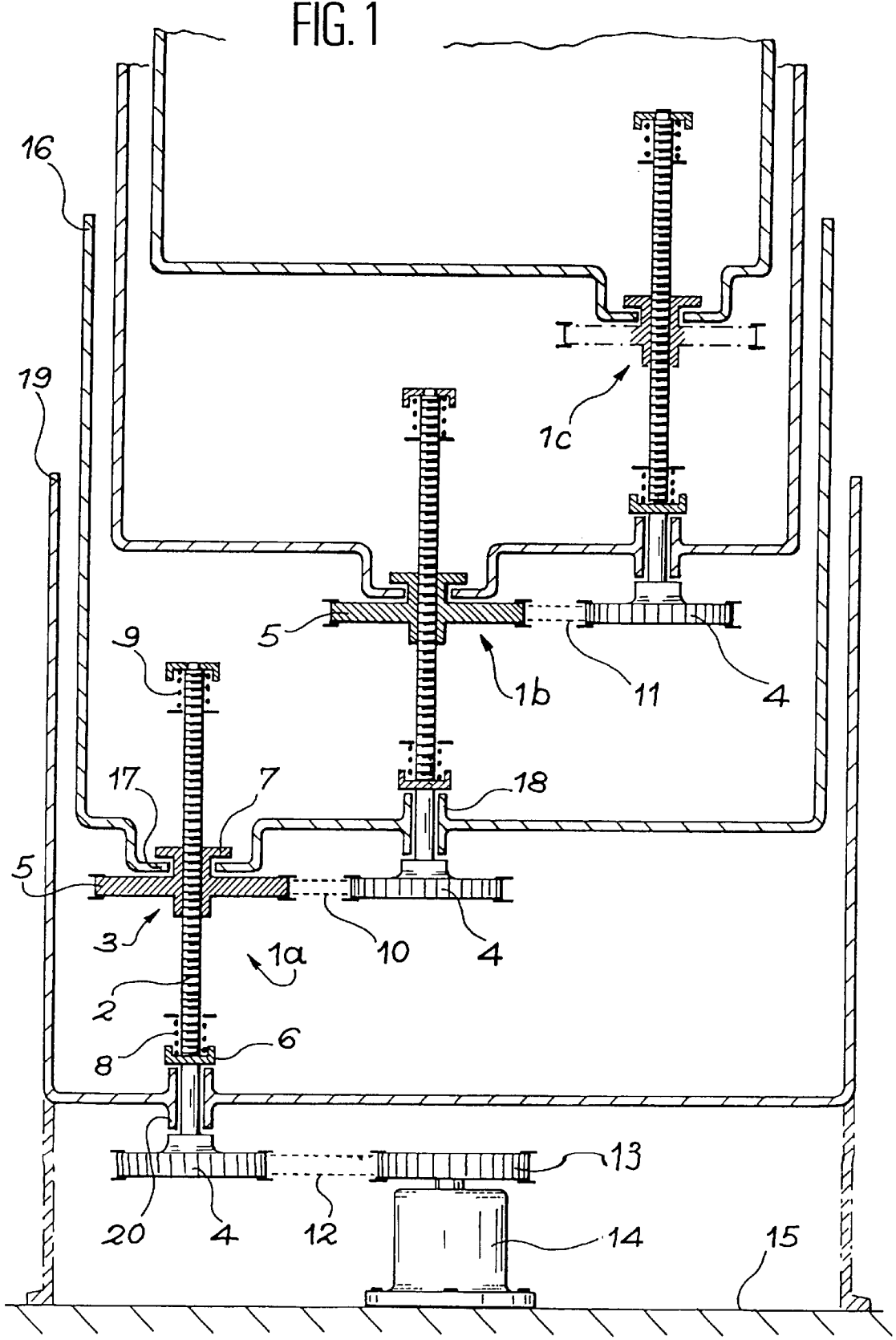
FIG. 1, already described, a prior art system.
Figure 2:
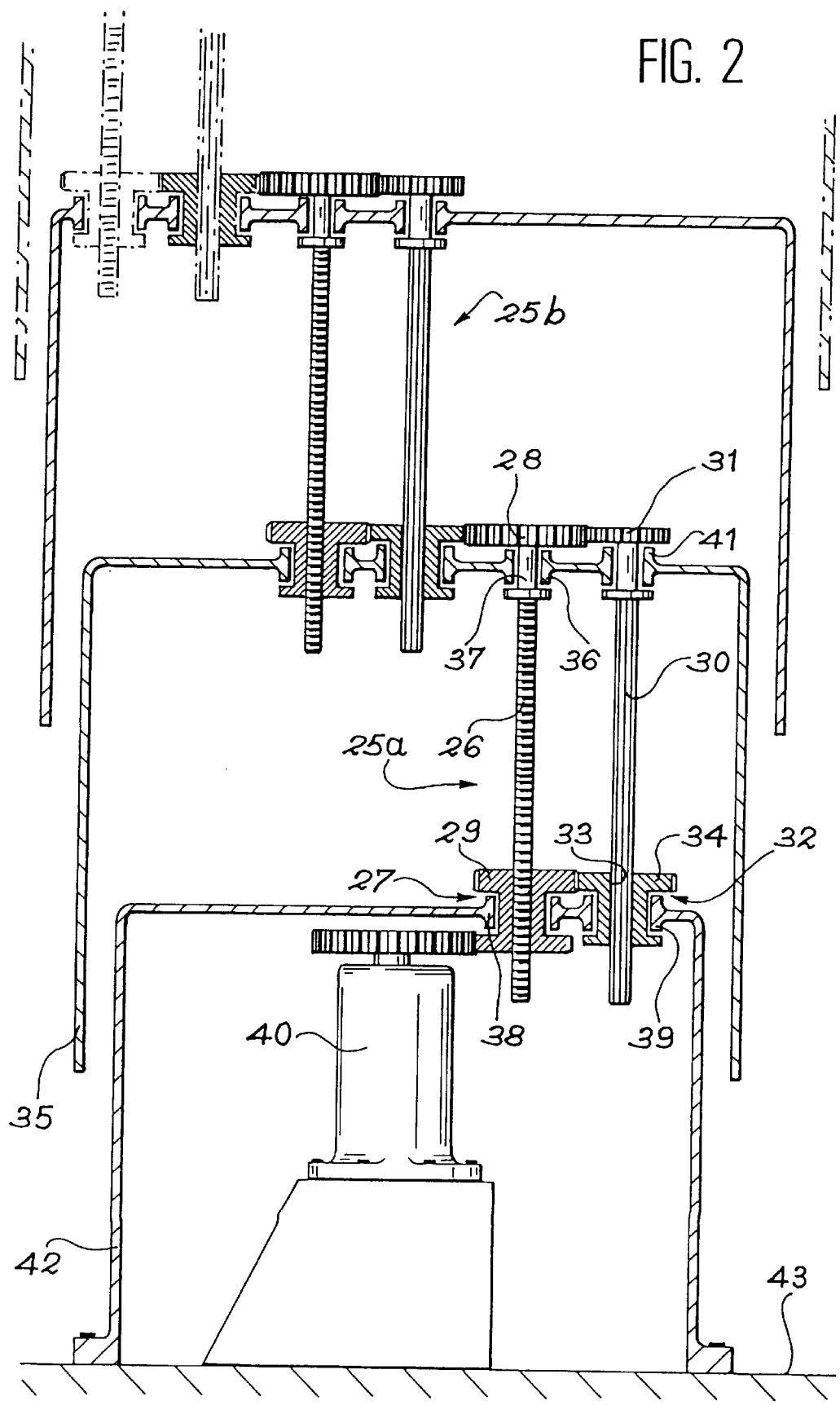
FIG. 2 a first embodiment of the invention.

The device of FIG. 2 comprises at least two extension modules 25a, 25b, which can be extended by other modules in a total random number, as for the following embodiment. These modules comprise a screw 26, a nut 27 engaged on the screw 26, a screw toothed wheel 28 in front of the screw 26, a nut toothed wheel 29 on the nut 27, a transmission shaft 30 parallel to the screw 26, a shaft toothed wheel 31 in front of the transmission shaft 30 and meshing with the screw toothed wheel 28, a bushing 32 in which the transmission shaft 30 slides whilst being retained therein in rotation by grooves 33 and a bushing toothed wheel 34 meshing with the nut toothed wheel 29.

Each module also comprises a tube 35 equipped with a bearing 36 in which rests a bearing surface 37 of the screw 26, between the threaded part of the screw 26 and the screw toothed wheel 28, and a bearing 41, which supports a bearing surface of the transmission shaft 30 just behind the shaft toothed wheel 31. The nut 27 and bushing 32 are supported in bearings 38 and 39 of the tube 35 of the preceding module 25 or, for the first module 25a, a base tube 42 coaxial to the tube 35 and fixed to a frame 37 of the system.

It is important to point out that, except for the last module, the screw toothed wheel 28 meshes with the bushing toothed wheel 34 of the following module 25. Under these conditions, when a motor 40 fixed to the frame 43 drives the nut 27 of the first module 25a, the movement is transmitted by the toothed wheels of nut 29, bushing 34, shaft 31 and screw 28 to the screw 26 of said module 25a, as well as to the bushing toothed wheel 34 of the following module 25b, then to the nut 27 of said module 25b by the nut toothed wheel 29, to the screw 26 of said module 25b by the toothed wheels of nut 31 and screw 28 and to the screws 26 and nuts 27 of the following modules 25c, etc. As the rotations of the nuts 27 and screws 26 are all imposed by gear tooth ratios, the translations of the screws 26 and therefore the tubes 35 are also subject to this condition. There is no shock or impact due to a stop. As the movements are simultaneous and no timing exists, except from the mechanical clearances, the extension or opening out is simultaneous for all the tubes 35. These results are obtained whilst retaining the advantage of only using a single motor 40 or more generally a single control actuator. It is possible to perfectly evaluate the inertia of parts of the mechanisms and their friction with a good precision level, at any time of the folding or unfolding procedure and it is therefore possible to choose dynamic control means taking account of these factors and permitting a good control precision. Finally, the system can be rendered easily reversible if the angles of the screws 26 and the efficiency levels of the transmissions are adequate. It is possible to choose for this purpose ball screws with large spiral angles of about 45°. A reversible system permits an automatic stoppage of the extension, even if the motor is still operating, by the limitation of the motive force to a clearly defined resistance value. The numerous toothed wheels or gears offer considerable possibilities for regulating the ratio of the mechanisms, i.e. the ratio of the translation of the screw to the rotation of the nut.

Figure 3:
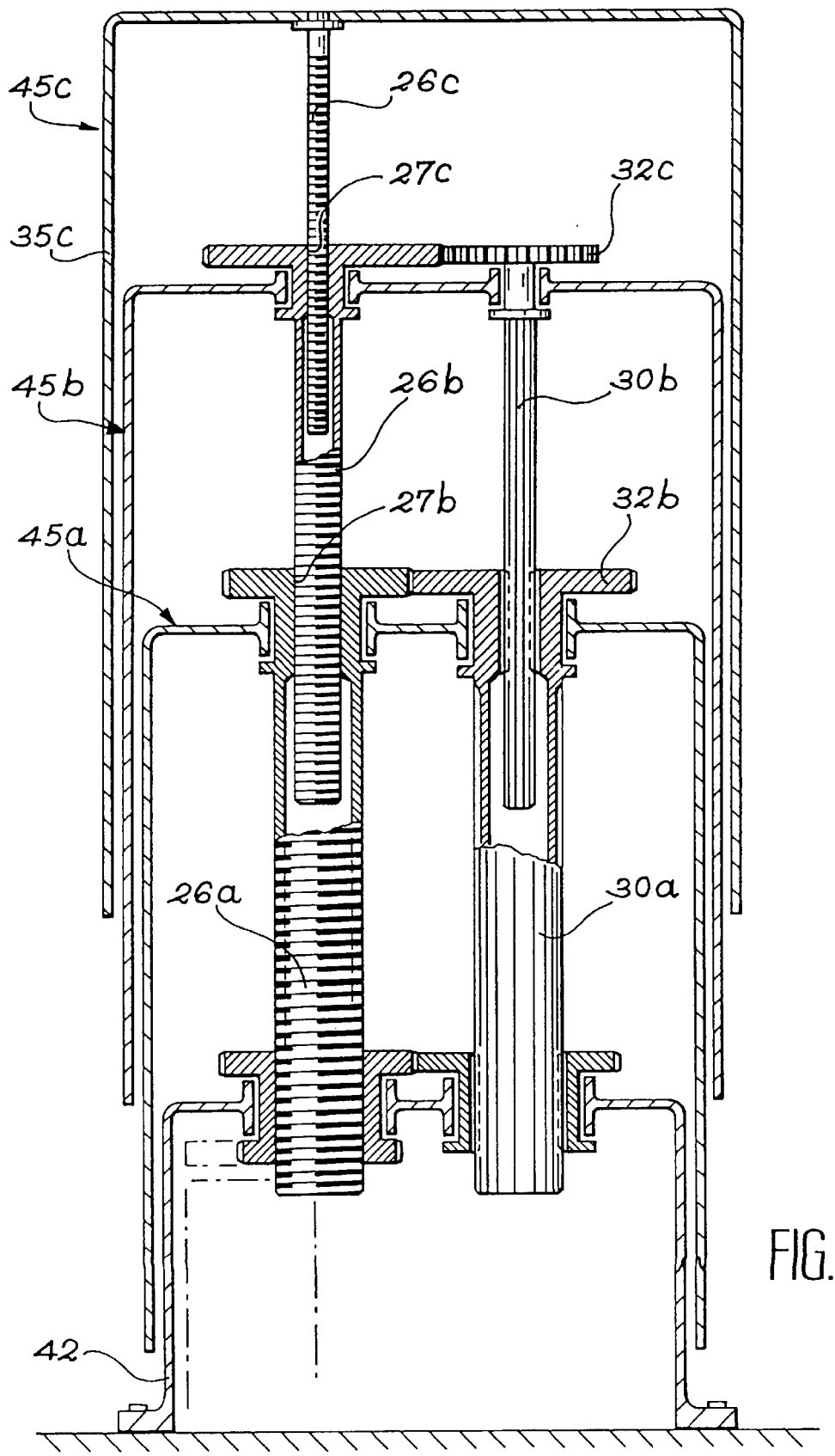
FIG. 3 a variant.

This first embodiment of the invention suffers from the disadvantage, compared with the preceding mechanism, of an increase in weight due to the transmission shafts 30 and fails to improve the concentricity of the mechanisms of the different modules 25. However, the variant of FIG. 3 is free from these deficiencies, because the mechanisms of these modules are all concentric, more simple and less heavy. A system is illustrated having three extension modules 45a, 45b and 45c, although the third module 45c is incomplete at the end of the system and is limited to a tube 35c, to which is fixed a screw 26c. In reality, there is no theoretical limit to the number of modules.

The screws 26a, 26b and 26c are hollow and penetrate one another, thinning towards the end, with the exception of the screw 26c, which can be solid.

The nuts 27b and 27c are here integral with the screws 26a or 26b of the preceding module and are obviously coaxial to said screw, whilst the bushings 32b and 32c are integral with the transmission shaft 30a or 30b of the preceding module, so that the transmission shafts 30a, 30b of the modules having the same, namely the first two modules 35a and 35b are concentric and slide in one another. This variant functions in roughly the same way as the previous variant, due to rotations of the motor transmitted both to all the screws and all the nuts and with different angles between the screws and nuts in order to produce a screwing and a translation of the modules. Its only shortcoming, due to the smaller-number of toothed wheels, is that the transmission ratios are not as easy to choose freely.

A construction of a different type will be described with the aid of FIG. 4. A telescopic system extension module 55 once again comprises a screw 56, a nut 57 and a bushing 58, which are engaged thereon by threads 59 and grooves 60 of the screw 56. Therefore the screw 56 is a grooved screw, which rotates the bushing 58, but which is free with respect thereto in translation. Ball bearings 61, 62 enable the nut 57 and bushing 58 to rotate freely in a tube 63 coaxial thereto and to the screw 56. Finally, there is a nut toothed wheel 64, a bushing toothed wheel 65 and two pinions 66, 67, respectively engaged with the two toothed wheels 64, 65 and joined by a connecting shaft 68 engaged in a perforation of the tube 63. As the connecting shaft 68 pivots freely in the perforation and the pinions 66 and 67 are integral therewith, the assembly forms a reduction gear train. The screw 56 traverses the toothed wheels 64, 65, which are centrally recessed, but without touching them.

A rotation of the nut 57 brings about a different rotation of the bushing 58 and screw 56 and therefore a translation by screwing of the latter. The rotation can be imposed on the nut 57 by another grooved screw surrounding the screw 56 and integral with the nut 57 opposite to the gear train or, as shown, by means of another identical gear train and having a second nut toothed wheel 69, a screw toothed wheel 70 and two pinions 71, 72, rotating together with a connecting shaft 73 engaged in a perforation of the tube 63 and respectively engaged with the toothed wheels 69, 70. The channelled screw of the preceding module 74 is integral with the screw toothed wheel 70. Other designs compatible with this operating principle are possible. It is also possible to eliminate the ball bearing 72 so that the bushing 58 is integral with the tube 63, so that the screw 56 of said module is locked in rotation. This construction can be adopted for the end of the system. It is also possible to weld the screw to the end of a tube sealed at the end in order to obtain the same effect. The bushing 58 is then omitted.

Figure 4:
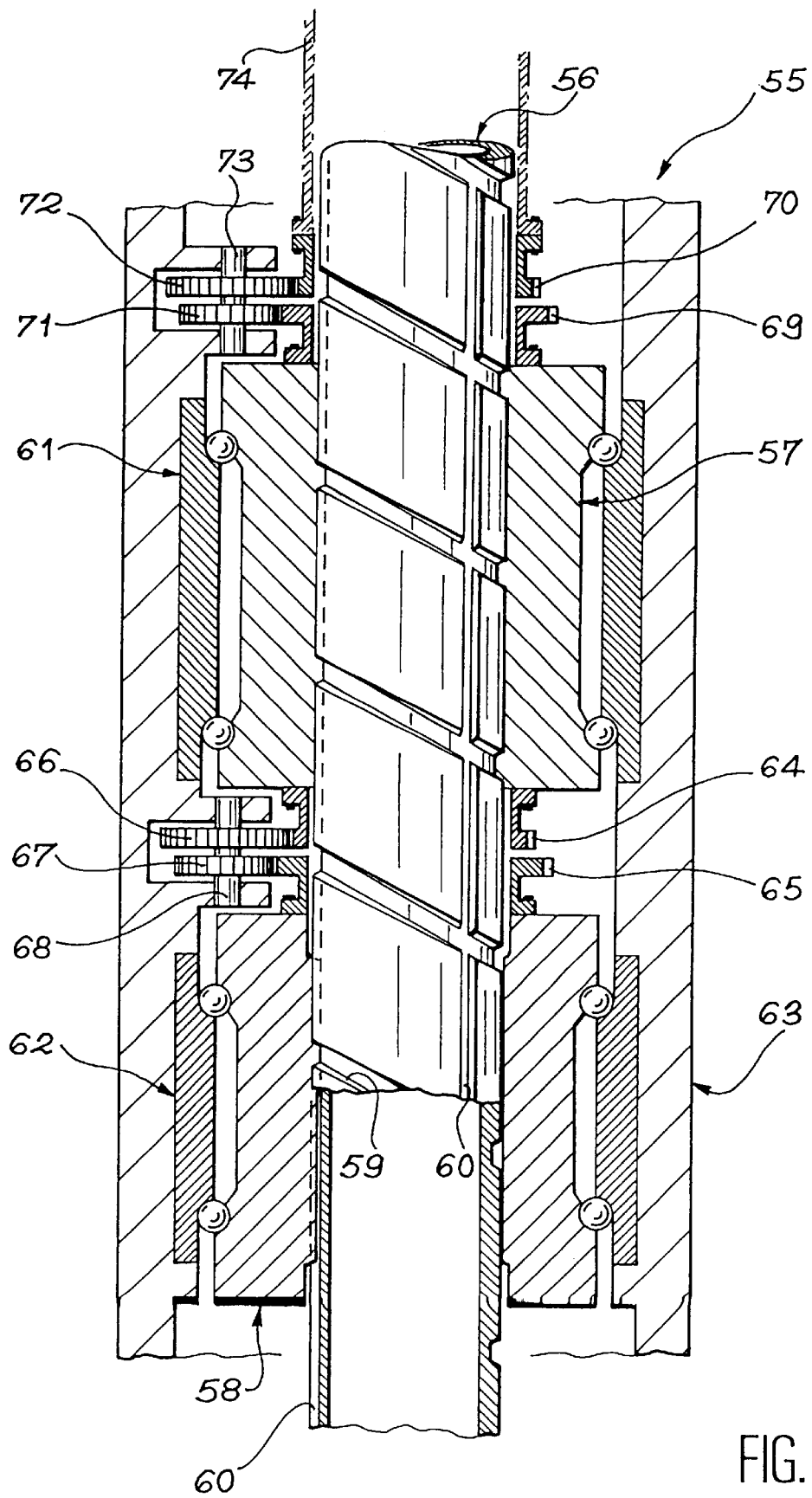
FIG. 4 A module of a second embodiment of the invention.
Figure 5:
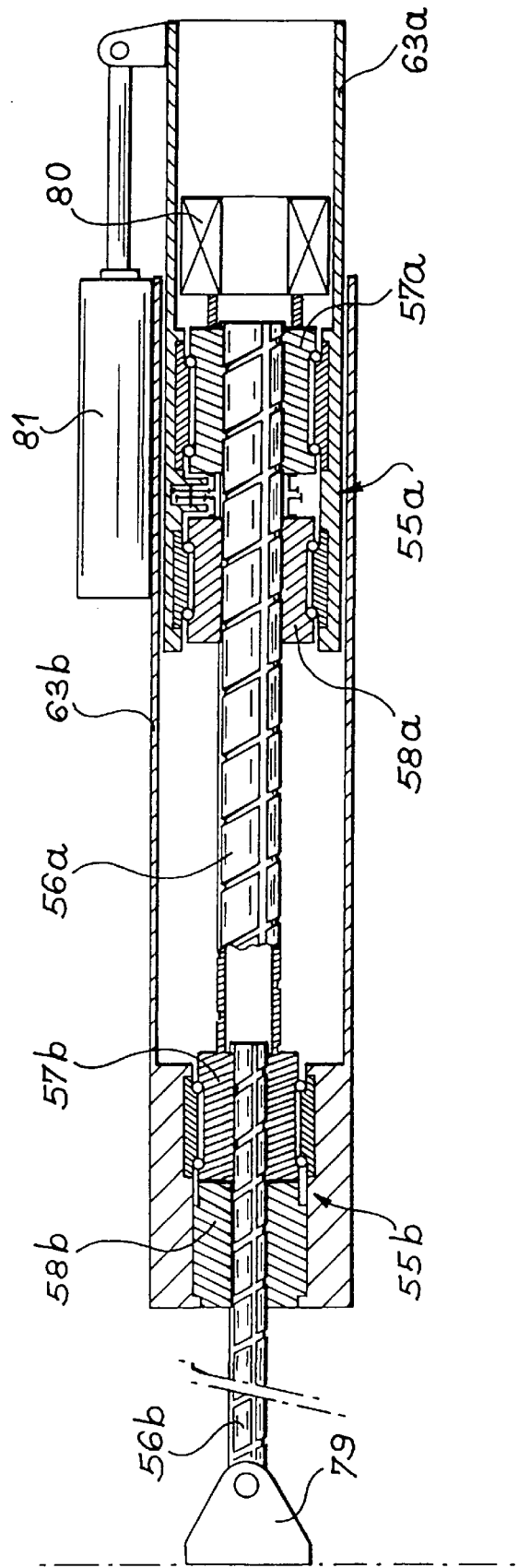
FIG. 5 completely a second embodiment of the invention.

FIG. 5 completely illustrated a telescopic system incorporating the module of FIG. 4. It is possible to see two modules 55a and 55b, whereof the screw 56a of the first is rigidly joined to the nut 57b of the second. The screw 56b of the second module 55b, which constitutes the end of the system, is terminated by an articulated pad 79, which can serve as a support element. The system is then an extensible, walking robot support leg. The nut 57a of the first module 55a is displaced by a motor 80 engaged in the tube 63a. It is a ring motor, whose recess permits the passage of the screw 56a. Space which can be occupied by other motors, sensors or other means is provided behind the motor 80 in the tube 63a. A jack 81 can join the tubes 63a and 63b. It then constitutes the mechanism regulating their position in place of the previously described motors. The motor 80 is then omitted. Such a jack with an orientation parallel to the extension direction can be used when the screw-nut systems are reversible, no matter which construction is chosen.

These systems can be controlled either by a nut, which has hitherto been proposed, or by a screw. It is normally the end screw which is driven by a motor located at its end.

I claim:

1. A telescopic system comprising:
 a plurality of modules, each of said modules comprising a case, a nut rotating that is freely rotatable in said case and prevented from translating with respect to said case, and a screw engaged with said nut, each of said cases being mutually freely slidable and prevented from rotating with respect to each other, the modules being arranged in chain, adjacent modules in said chain being interconnected by a rotation transmission coupling between one of the screw and nut of said adjacent modules, each of the modules including a rotation transmission link between said screw and said nut.

2. The telescopic system according to claim 1, wherein the rotation transmission coupling between one of the screw and nut of aid adjacent modules includes at least one gear.

3. The telescopic system according to claim 2, wherein the rotation transmission link includes:
 an intermediate toothed wheel,
 a shaft parallel to the screw, said intermediate toothed wheel sliding on the shaft, and
 a toothed wheel integral with the nut.

4. The telescopic system according to claim 1, wherein the rotation transmission link includes a bushing linked with the screw by at least one groove.

5. The telescopic system according to claim 4, wherein the bushing is prevented from translating with respect to said case and rotates freely in said case.

6. The telescopic system according to claim 4, wherein said case is tubular and the rotation transmission link includes at least one toothed wheel that is rotatable about a shaft mounted in the tube.

7. The telescopic system according to claim 4, wherein the couplings are rigid couplings.

8. The telescopic system according to claim 1, wherein the screws of said adjacent modules are concentric and penetrate one another.

9. The telescopic system according to claim 1, wherein said nut is integral with said screw.

10. A telescopic system comprising:
 a first case;
 a first screw;
 a first nut threaded on said first screw, said first nut being rotatably attached to said first case so that said first screw is translatable through said first nut when said first nut is rotated;
 a second case;
 a second screw;
 a second nut threaded on said second screw, said second nut being rotatably attached to said second case so that said second screw is translatable through said second nut when said second nut is rotated;
 a rotation transmission coupling for transmitting rotation of said first nut to said second nut, said rotation transmission coupling including a rotation transmission link for transmitting rotation of said first nut to said first screw.

11. The telescopic system according to claim 10, wherein said first screw is integral with said second nut.

12. The telescopic system according to claim 11, further comprising
 a third case;
 a third screw;
 a third nut, said third nut being threaded on said third screw, said third nut being rotatably attached to said third case so that said third screw is translatable through said third nut when said third nut is rotated; and
 a rotation transmission coupling for transmitting rotation of said second nut to said third nut, said rotation transmission coupling including a rotation transmission link for transmitting rotation of said second nut to said second screw.

13. The telescopic system according to claim 10, wherein said rotation transmission coupling includes means for causing said second screw to translate through said second nut when said first screw translates through said first nut.

14. The telescopic system according to claim 10, wherein said rotation transmission link includes a bushing that receives a shaft, said bushing being coupled to said first nut via a toothed wheel, at least one of said bushing and said shaft including a groove, said groove being parallel with a longitudinal axis of said screw.

15. The telescopic system according to claim 14, wherein said shaft includes a toothed wheel and said first screw includes a toothed wheel, said toothed wheel of said shaft being engaged with said toothed wheel of said first screw.

16. The telescopic system according to claim 15, wherein said toothed wheel of said shaft is integral with said shaft, and said toothed wheel of said first screw is integral with said first screw.

17. The telescopic system according to claim 10, wherein said first screw is rotatably attached to said second case.

18. The telescopic system according to claim 10, wherein said first case includes a first tubular member and said second case includes a second tubular member.

19. The telescopic system according to claim 10, wherein said rotation transmission link includes a shaft rotatably mounted to said first case, said shaft including a first pinion and a second pinion, said first pinion having a diameter different than a diameter of said second pinion.

20. The telescopic system according to claim 19, wherein said first pinion is rotatably coupled to said first nut and said second pinion is rotatably coupled to a bushing that receives said shaft.

21. A telescopic system comprising:

a first case;

a first screw;

a first nut threaded on said first screw, said first nut being rotatably attached to said first case so that said first screw is translatable through said first nut when said first nut is rotated;

a second case;

a second screw;

a second nut threaded on said second screw, said second nut being rotatably attached to said second case so that said second screw is translatable through said second nut when said second nut is rotated; and means for transmitting rotation of said first nut to said second nut with said first screw during translation of said first screw through said first nut.

22. The telescopic system according to claim 21, wherein said second screw is located at least partially inside said first screw.

23. The telescopic system according to claim 21, wherein said second case includes an interior that receives at least a portion of said first case.

24. A telescopic system comprising:

a first case and a second case telescopically arranged;

a first screw and a second screw;

a first nut and a second nut, said first nut being threaded on said first screw, said first nut being rotatably attached to said first case, said second nut being threaded on said second screw, said second nut being rotatably attached to said second case;

a rotation transmission coupling between said first nut and said second nut; and a rotation transmission link between said first screw and said first nut.

25. The telescopic system according to claim 24, further comprising a rotation transmission link between said second screw and said second nut.

26. The telescopic system according to claim 24, wherein said rotation transmission link is part of said rotation transmission coupling.

* * * * *